(12) United States Patent
Prieto et al.

(10) Patent No.: US 9,115,252 B2
(45) Date of Patent: Aug. 25, 2015

(54) PE-BASED CROSSLINKED ELASTOMERIC FOAM WITH HIGH FILLER LOADINGS FOR MAKING SHOCKPADS AND ARTICLES USED IN FOOTWEAR AND FLOORING APPLICATIONS

(75) Inventors: Miguel A. Prieto, Richterswil (CH); Katja Oswald, Zurich (CH); Enrique Torres, Thalwil (CH); Thomas T. Allgeuer, Wollerau (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 1532 days.

(21) Appl. No.: 12/345,056

(22) Filed: Dec. 29, 2008

(65) Prior Publication Data
US 2009/0172970 A1     Jul. 9, 2009

Related U.S. Application Data

(60) Provisional application No. 61/017,421, filed on Dec. 28, 2007, provisional application No. 61/091,169, filed on Aug. 22, 2008.

(51) Int. Cl.
*B32B 5/22* (2006.01)
*C08J 9/00* (2006.01)
(Continued)

(52) U.S. Cl.
CPC ............ *C08J 9/0014* (2013.01); *A43B 13/187* (2013.01); *C08J 9/0061* (2013.01); *C08J 9/0066* (2013.01); *C08L 23/0853* (2013.01); *D06N 7/0086* (2013.01); *C08J 2201/024* (2013.01);
(Continued)

(58) Field of Classification Search
USPC .................. 428/317.9, 314.4, 314.8
See application file for complete search history.

(56) References Cited

U.S. PATENT DOCUMENTS

| 3,332,828 A | 7/1967 | Faria et al. |
| 3,551,263 A | 12/1970 | Carter et al. |

(Continued)

FOREIGN PATENT DOCUMENTS

| EP | 1872924 A1 | 1/2008 |
| WO | 00/01745 | 1/2000 |

(Continued)

OTHER PUBLICATIONS

International Preliminary Report on Patentability issued by the International Bureau of WIPO on Jun. 29, 2010 in corresponding PCT application No. PCT/US2008/087911 (7 pages).

(Continued)

*Primary Examiner* — Hai Vo
(74) *Attorney, Agent, or Firm* — Osha Liang LLP

(57) ABSTRACT

Crosslinked foams having high filler loadings, which may be formed from A) a polyolefin having a crystallinity of 21 percent or less, an ethylene vinyl acetate copolymer having a vinyl acetate content of less than 15 mole percent, or a combination thereof; B) a polyolefin having a viscosity between 500 and 20,000 cP, as measured using ASTM D1084 (Brookfield Viscosity at 350° F.); and C) a filler, wherein the crosslinked foam includes from 10 to 80 parts filler per hundred parts of components A, B, and C, by weight. In other aspects of embodiments disclosed herein, the crosslinked foam may optionally include one or more of: D) at least one polyolefin having a crystallinity of greater than 21 weight percent, an ethylene vinyl acetate copolymer having a vinyl acetate content of 15 mole percent or greater, or a combination thereof; and E) a scorch retarder.

13 Claims, 3 Drawing Sheets

(51) Int. Cl.
*A43B 13/18* (2006.01)
*C08L 23/08* (2006.01)
*D06N 7/00* (2006.01)
*C08L 23/02* (2006.01)

(52) U.S. Cl.
CPC ........ *C08J2201/03* (2013.01); *C08J 2205/052* (2013.01); *C08J 2323/00* (2013.01); *C08J 2323/08* (2013.01); *C08J 2423/00* (2013.01); *C08L 23/02* (2013.01); *C08L 2205/02* (2013.01)

(56) References Cited

U.S. PATENT DOCUMENTS

| | | | |
|---|---|---|---|
| 3,597,297 A | 8/1971 | Buchholtz et al. | |
| 3,644,230 A | 2/1972 | Cronin | |
| 3,645,992 A | 2/1972 | Elston | |
| 3,758,643 A | 9/1973 | Fischer | |
| 3,806,558 A | 4/1974 | Fischer | |
| 4,076,698 A | 2/1978 | Anderson et al. | |
| 4,104,210 A | 8/1978 | Coran et al. | |
| 4,130,535 A | 12/1978 | Coran et al. | |
| 4,202,801 A | 5/1980 | Petersen | |
| 4,214,054 A | 7/1980 | Watanabe et al. | |
| 4,250,273 A | 2/1981 | Bohm et al. | |
| 4,271,049 A | 6/1981 | Coran et al. | |
| 4,311,628 A | 1/1982 | Abdou-Sabet et al. | |
| 4,340,684 A | 7/1982 | Bohm et al. | |
| 4,389,435 A | 6/1983 | Haas, Jr. | |
| 4,446,254 A * | 5/1984 | Nakae et al. | 521/50.5 |
| 4,505,960 A | 3/1985 | Leffingwell | |
| 4,599,392 A | 7/1986 | McKinney et al. | |
| 4,637,942 A | 1/1987 | Tomarin et al. | |
| 4,762,890 A | 8/1988 | Strait et al. | |
| 4,882,208 A | 11/1989 | Breitscheidel et al. | |
| 4,908,278 A | 3/1990 | Bland et al. | |
| 4,927,882 A | 5/1990 | Bayan | |
| 4,927,888 A | 5/1990 | Strait et al. | |
| 4,950,541 A | 8/1990 | Tabor et al. | |
| 4,988,781 A | 1/1991 | McKinney et al. | |
| 5,051,478 A | 9/1991 | Puydak et al. | |
| 5,248,729 A | 9/1993 | Inoue et al. | |
| 5,272,236 A | 12/1993 | Lai et al. | |
| 5,278,272 A | 1/1994 | Lai et al. | |
| 5,384,373 A | 1/1995 | McKinney et al. | |
| 5,504,172 A | 4/1996 | Imuta et al. | |
| 5,728,744 A * | 3/1998 | Okada et al. | 521/95 |
| 5,750,584 A | 5/1998 | Knaus | |
| 5,844,045 A | 12/1998 | Kolthammer et al. | |
| 5,869,575 A | 2/1999 | Kolthammer et al. | |
| 6,005,053 A * | 12/1999 | Parikh et al. | 525/221 |
| 6,051,681 A | 4/2000 | Dozeman et al. | |
| 6,221,928 B1 * | 4/2001 | Kozma et al. | 521/86 |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,696,516 B2 * | 2/2004 | Morikawa et al. | 524/526 |
| 2003/0013778 A1 | 1/2003 | Sueda et al. | |
| 2006/0199905 A1 * | 9/2006 | Hughes et al. | 525/191 |

FOREIGN PATENT DOCUMENTS

| | | |
|---|---|---|
| WO | 2004035680 A1 | 4/2004 |
| WO | 2005023912 | 3/2005 |
| WO | 2006/099631 A1 | 9/2006 |

OTHER PUBLICATIONS

Notification of Transmittal of the International Search Report and the Written Opinion of the International Searching Authority, or the Declaration Dated Apr. 27, 2009 pp. 182.
Peroxide Vulcanization of Elastomer, Jul.-Aug. 2001, vol. 74, No. 3.
Mar. 2006 FIFA Quality Concept Requirements for Artificial Turf Surfaces.
Translation of a Second Office Action mailed Aug. 3, 2012 in corresponding Chinese Patent Application No. 200880127661.3 (2 pages).

* cited by examiner

PE-BASED CROSSLINKED ELASTOMERIC FOAM WITH HIGH FILLER LOADINGS FOR MAKING SHOCKPADS AND ARTICLES USED IN FOOTWEAR AND FLOORING APPLICATIONS

CROSS-REFERENCE TO RELATED APPLICATION

This application, pursuant to 35 U.S.C. §119(e), claims priority to U.S. Provisional Application Ser. Nos. 61/017,421, filed Dec. 28, 2007 and 61/091,169, filed Aug. 22, 2008, each of which are incorporated herein by reference.

BACKGROUND OF DISCLOSURE

1. Field of the Disclosure

Embodiments disclosed herein relate generally to crosslinked foams suitable for use as a shock absorbing layer. In another aspect, embodiments disclosed herein relate to crosslinked foams useful in footwear, such as part of a shoe or boot, including soles, midsoles, or a complete shoes or boot. In another aspect, embodiments described herein relate to a synthetic turf and other flooring applications including a crosslinked foam shock absorbing layer, where the foam may include up to 50% of a filler.

2. Background

Conventional articles of footwear include two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces, the sole structure may provide traction and control potentially harmful foot motion, such as over-pronation. Accordingly, the upper and the sole structure operate cooperatively to provide a comfortable structure that is suited for a wide variety of ambulatory activities, such as walking and running. The general features and configuration of the upper and the sole structure are discussed in greater detail below.

The upper forms a void on the interior of the footwear for receiving the foot. The void has the general shape of the foot, and access to the void is provided by an ankle opening. Accordingly, the upper extends over the instep and toe areas of the foot, along the medial and lateral sides of the foot, and around the heel area of the foot. A lacing system is often incorporated into the upper to selectively increase the size of the ankle opening and permit the wearer to modify certain dimensions of the upper, particularly girth, to accommodate feet with varying proportions. In addition, the upper may include a tongue that extends under the lacing system to enhance the comfort of the footwear, and the upper may include a heel counter to limit movement of the heel.

Various materials may be utilized in manufacturing the upper. The upper of an article of footwear, for example, may be formed from multiple material layers that include an exterior layer, a middle layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability. Accordingly, various other areas of the exterior layer of the upper may be formed from a synthetic textile. The exterior layer of the upper may be formed, therefore, from numerous material elements that each imparts different properties to specific areas of the upper.

A middle layer of the upper may be formed from a lightweight polymer foam material that attenuates ground reaction forces and protects the foot from objects that may contact the upper. Similarly, an interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

The sole structure generally incorporates multiple layers that are conventionally referred to as an insole, a midsole, and an outsole. The insole is a thin, comfort-enhancing member located within the upper and adjacent the plantar (lower) surface of the foot to enhance footwear comfort. The midsole, which is traditionally attached to the upper along the entire length of the upper, forms the middle layer of the sole structure and serves a variety of purposes that include controlling foot motions and attenuating ground reaction forces. The outsole forms the ground-contacting element of footwear and is usually fashioned from a durable, wear-resistant material that includes texturing to improve traction.

The primary element of a conventional midsole is a resilient, polymer foam material, such as polyurethane or ethylvinylacetate, which extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness, degree of ground reaction force attenuation, and energy absorption properties may be altered to meet the specific demands of the activity for which the footwear is intended to be used.

Various foams also find use as a shock-absorbing layer in artificial turf. Artificial turf consists of a multitude of artificial grass tufts extending upward from a sheet substrate. The turf is usually laid upon a prepared, flat ground surface to form a game playing field intended to simulate a natural grass playing field surface.

For some types of games, a resilient underpad is placed beneath the turf and upon the firm ground support surface to provide a shock absorbing effect. Also, in some instances, a layer of sand or other particulate material is placed upon the upper surface of the carpet base sheet and around the strands. An example of this type of construction is shown in U.S. Pat. No. 4,389,435 issued Jun. 21, 1983 to Frederick T. Haas, Jr. Another example is shown in U.S. Pat. No. 4,637,942 issued Jan. 20, 1987 to Seymour A. Tomarin.

Further, examples of artificial turfs which are formed with the grass-like carpet placed upon a resilient underpad are disclosed in U.S. Pat. No. 3,551,263 issued Dec. 29, 1970 to Carter et al., which discloses a polyurethane foam underpad; U.S. Pat. No. 3,332,828 issued Jul. 25, 1967 to Faria et al., which discloses a PVC foam plastic or polyurethane foam plastic underpad; U.S. Pat. No. 4,637,942 issued Jan. 20, 1987 to Seymour A. Tomarin which discloses a rubber-like underpad; U.S. Pat. No. 4,882,208 issued Nov. 21, 1989 to Hans-Urich Brietschidel, which illustrates a closed cell crosslinked polyethylene foam underpad; U.S. Pat. No. 3,597,297 issued Aug. 3, 1971 to Theodore Buchholz et al., which discloses a polyurethane underpad having voids; and U.S. Pat. No. 4,505,960 issued Mar. 19, 1985 to James W. Leffingwell, which discloses shock absorbing pads made from elastomer foams of polyvinyl chloride, polyethylene, polyurethane, polypropylene, etc.

Shock absorbing layers may, of course, be more broadly used in other applications, such as in energy dampening in floors and shockpads for shoes, for example. What is still needed, therefore, are improved materials and methods for forming shock absorbing layers. There also exists a need for improved materials that may be used to form portions of a shoe or boot, including the sole, midsole, or other various portions of a shoe.

SUMMARY OF INVENTION

In one aspect, embodiments disclosed herein relate to crosslinked foams having high filler loadings, which may be formed from A) a polyolefin having a crystallinity of 21 percent or less, an ethylene vinyl acetate copolymer having a vinyl acetate content of less than 15 mole percent, or a combination thereof; B) a polyolefin having a viscosity between 500 and 20,000 cP, as measured using ASTM D1084 (Brookfield Viscosity at 350° F.); and C) a filler, wherein the crosslinked foam includes from 10 to 80 parts filler per hundred parts of components A, B, and C, by weight.

In other aspects of embodiments disclosed herein, the crosslinked foam may optionally include one or more of: D) at least one polyolefin having a crystallinity of greater than 21 weight percent, an ethylene vinyl acetate copolymer having a vinyl acetate content of 15 mole percent or greater, or a combination thereof; and E) a scorch retarder.

In yet other aspects, embodiments disclosed herein relate to an artificial turf including a shock pad, or to a shoe, boot or footwear, formed from crosslinked foams having high filler loadings, which may be formed from A) a polyolefin having a crystallinity of 21 percent or less, an ethylene vinyl acetate copolymer having a vinyl acetate content of less than 15 mole percent, or a combination thereof; B) a polyolefin having a viscosity between 500 and 20,000 cP, as measured using ASTM D1084 (Brookfield Viscosity at 350° F.); and C) a filler, wherein the crosslinked foam includes from 10 to 80 parts filler per hundred parts of components A, B, and C, by weight.

Other aspects of embodiments disclosed herein relate to a method for forming a crosslinked foam, the method including: combining the following ingredients to form an expandable composition: A) a polyolefin having a crystallinity of 21 percent or less, an ethylene vinyl acetate copolymer having a vinyl acetate content of less than 15 mole percent, or a combination thereof; B) a polyolefin having a viscosity between 500 and 20,000 cP, as measured using ASTM D1084; C) a filler, wherein the crosslinked foam includes from 10 to 80 parts filler per hundred parts of components A, B, and C, by weight; and D a blowing agent; crosslinking at least a portion of components A, B, and C; and foaming the expandable composition.

In other aspects of the method for forming crosslinked foams described herein, the expandable composition may also include E. a scorch retarder; and F. at least one polyolefin having a crystallinity of greater than 21 weight percent, an ethylene vinyl acetate copolymer having a vinyl acetate content of 15 mole percent or greater, or a combination thereof; and the method including crosslinking at least a portion of components A, B, and F.

Other aspects and advantages of the invention will be apparent from the following description and the appended claims.

DETAILED DESCRIPTION

General Definitions and Measurement Methods

Figure 1:
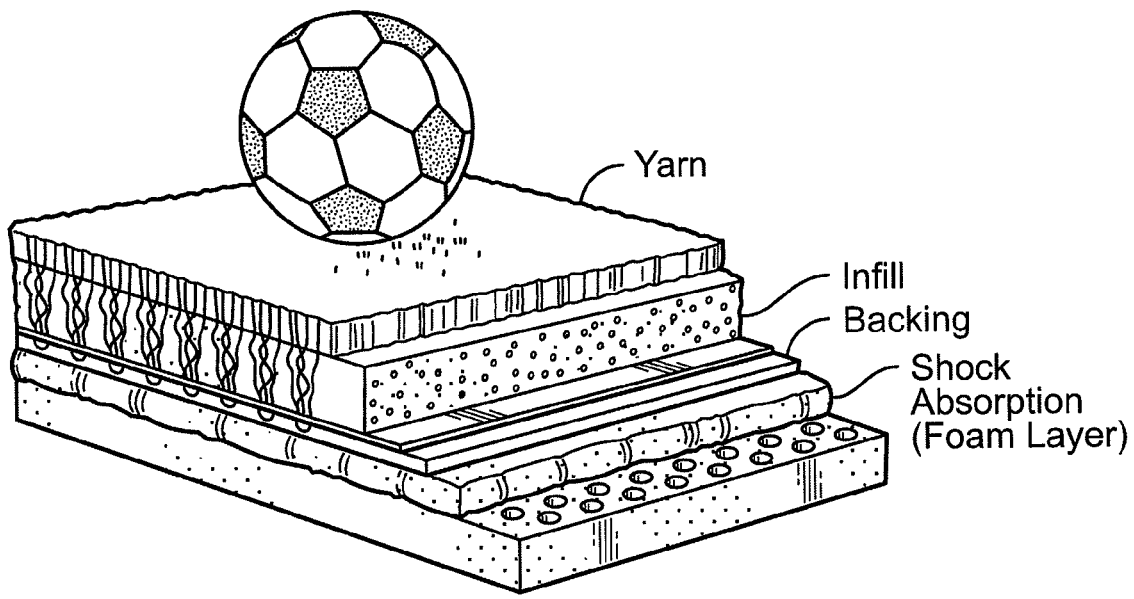
FIG. 1 illustrates an artificial turf system incorporating crosslinked foams according to embodiments disclosed herein as a shockpad.

The following terms shall have the given meaning for the purposes of this invention:

"Polymer" means a substance composed of molecules with large molecular mass consisting of repeating structural units, or monomers, connected by covalent chemical bonds. The term 'polymer' generally includes, but is not limited to, homopolymers, copolymers such as block, graft, random and alternating copolymers, terpolymers, etc., and blends and modifications thereof. Further, unless otherwise specifically limited, the term 'polymer' shall include all possible geometrical configurations of the molecular structure. These configurations include isotactic, syndiotactic, random configurations, and the like.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). The class of materials known as "interpolymers" also encompasses polymers made by polymerizing four or more types of monomers.

Density of resins and compositions is measured according to ASTM D792.

Density of foams is measured according to ASTM D3575/ W/B.

"Melt Index (I2)" is determined according to ASTM D1238 using a weight of 2.16 kg at 190° C. for polymers comprising ethylene as the major component in the polymer. "Melt Flow Rate" (MFR) is determined according to ASTM D1238 using a weight of 2.16 kg at 230° C. for polymers comprising propylene as the major component in the polymer.

Molecular weight distribution (MWD) of the polymers is determined using gel permeation chromatography (GPC), such as on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation: $\{N\}=KM^a$ where $K_{pp}=1.90E-04$, $a_{pp}=0.725$ and $K_{ps}=1.26E-04$, $a_{ps}=0.702$. "Molecular weight distribution" or MWD is measured by conventional GPC per the procedure described by Williams, T.; Ward, I. M. Journal of Polymer Science, Polymer Letters Edition (1968), 6(9), 621-624. Coefficient B is 1. Coefficient A is 0.4316.

The term "high pressure low density type resin" is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference) and includes "LDPE" which may also be referred to as "high pressure ethylene polymer" or "highly branched polyethylene." The cumulative detector fraction (CDF) of these materials is greater than about 0.02 for molecular weight greater than 1000000 g/mol as measured using light scattering. CDF may be determined as described in WO2005/023912 A2, which is herein incorporated by reference for its teachings regarding CDF. The preferred high pressure low density polyethylene material (LDPE) has a melt index MI (I2) of less than about 20, more preferably less than about 15, most preferably less than 10, and greater than about 0.1, more preferably greater than about 0.2, most preferably more than 0.3 g/10 min. The preferred LDPE will have a density between about 0.915 g/cm3 and 0.930 g/cm³, with less than 0.925 g/cm³ being more preferred.

"Crystallinity" means atomic dimension or structural order of a polymer composition. Crystallinity is often represented by a fraction or percentage of the volume of the material that is crystalline or as a measure of how likely atoms or molecules are to be arranged in a regular pattern, namely into a crystal. Crystallinity of polymers can be adjusted fairly precisely and over a very wide range by heat treatment. A "crystalline" "semi-crystalline" polymer possesses a first order transition or crystalline melting point (Tm) as determined by differential scanning calorimetry (DSC) or equivalent technique. The term may be used interchangeably with the term "semicrystalline." The term "amorphous" refers to a polymer lacking a crystalline melting point as determined by differential scanning calorimetry (DSC) or equivalent technique.

Differential Scanning Calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). DSC is a method suitable for determining the melting characteristics of a polymer.

DSC analysis is performed using a model Q1000 DSC from TA Instruments, Inc. DSC is calibrated by the following method. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. to 156.6° C. for the onset of melting and within 0.5 J/g to 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. to 0° C.

Polymer samples are pressed into a thin film at an initial temperature of 190° C. (designated as the 'initial temperature'). About 5 to 8 mg of sample is weighed out and placed in the DSC pan. The lid is crimped on the pan to ensure a closed atmosphere. The DSC pan is placed in the DSC cell and then heated at a rate of about 100° C./min to a temperature ($T_o$) of about 60° C. above the melt temperature of the sample. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. Enthalpy curves resulting from this experiment are analyzed for peak melt temperature, onset and peak crystallization temperatures, heat of fusion and heat of crystallization, and any other DSC analyses of interest.

When crystallinity of a polymer containing propylene crystallinity is analyzed, $T_o$ is 230° C. $T_o$ is 190° C. when polyethylene crystallinity is present and no polypropylene crystallinity is present in the sample.

Percent crystallinity by weight is calculated according to the following formula:

$$\text{Crystallinity(wt. \%)} = \frac{\Delta H}{\Delta H_o} \times 100\%$$

such that the heat of fusion ($\Delta H$) is divided by the heat of fusion for the perfect polymer crystal ($\Delta H_o$) and then multiplied by 100%. For ethylene crystallinity, $\Delta H_o$ is taken to be 290 J/g. For example, an ethylene-octene copolymer which upon melting of its polyethylene crystallinity is measured to have a heat of fusion of 29 J/g; the corresponding crystallinity is 10% by weight. For propylene crystallinity, $\Delta H_o$ is taken to be 165 J/g. For example, a propylene-ethylene copolymer which upon melting of its propylene crystallinity is measured to have a heat of fusion of 20 J/g; the corresponding crystallinity is 12.1% by weight.

Foam

In one aspect, embodiments described herein relate to a crosslinked thermoplastic foam. In another aspect, embodiments disclosed herein relate to a crosslinked thermoplastic foam having a relatively high filler loading. Such foams, due to a high filler loading, are dimensionally stable and low in cost.

The crosslinked foams disclosed herein may be based on a polyolefin-polyolefin elastomer system, such as a blend of plastomer and elastomer components, such as alpha-olefin copolymers, olefin block copolymers, and ethylene-propylene-diene terpolymers. In selected embodiments, the polymer blends used may provide various mechanical properties, such as hardness, foam density, split tear, compression set, and shrinkage and abrasion resistance. The polymer components blended may have similar or dissimilar melt indices, crystallinity, and molecular weight distributions. In some embodiments, one polymer component may have a low crystallinity, such as less than about 21%, and a second polymer component may have a higher crystallinity, such as greater than about 21%.

Crosslinked foams disclosed herein may also include a low molecular weight polyolefin as a lubricant. The lubrication provided by such a component may allow for the processing of compositions having a high filler loading, such as up to about 50 weight percent of the crosslinked foam composition.

Such compositions as described above may be injection or compression molded to form crosslinked foams in some embodiments. In other embodiments, crosslinked foams disclosed herein may be formed via flat-die sheet extrusion. Such foams may also be reground and/or recycled to form similar end-use articles, such as footwear or shock pads.

Compositions used to form the foams described herein may contain semi-crystalline polymers and high filler loadings, and may still allow for industrial processing, such as compounding, injection molding, compression molding, etc. Both fillers and crystalline materials may generate excessive heat during processing due to shear or high melting temperatures. For controlled crosslinking and foaming, premature decomposition of any curing agents and blowing agents should be avoided, such as by proper selection of curing agents, blowing agents, and processing temperatures.

Additionally, it was found that higher temperature processing needed for higher density components and high filler content compositions may require the use of a scorch retarder, such as when using a peroxide curing system. The hotter processing allowed via the scorch retarder may also provide an advantage of decreased cycle times for such compositions and peroxide systems. In some embodiments, cycle times may be reduced by up to 40%.

Embodiments of the crosslinked foams described herein may be useful in artificial turf systems. Other embodiments of the crosslinked foams described herein may be useful in footwear applications, such as soft sandals, high heel sandals, midsoles, outsoles, unisoles, etc., sports articles, furniture, and other applications where foams are used. Other applications for foams described herein may include toys, automotive applications, helmets, transportation and stadium seats, sound absorption applications, adhesive tapes, gaskets, and sealants.

As mentioned above, crosslinked foams described herein may be formed using several components, including various thermoplastic polymers, fillers, scorch retarders, curing agents, blowing agents, and others. Each of these is discussed in more detail below.

Thermoplastic Polymer

The thermoplastic polymer used to form crosslinked foams disclosed herein may vary depending upon the particular application and the desired result. In one embodiment, for instance, the polymer is an olefin polymer. As used herein, an olefin polymer, in general, refers to a class of polymers formed from hydrocarbon monomers having the general formula $C_nH_{2n}$. The olefin polymer may be present as a copolymer, such as an interpolymer, a block copolymer, or a multi-block interpolymer or copolymer.

In one particular embodiment, for instance, the olefin polymer may comprise an alpha-olefin interpolymer of ethylene with at least one comonomer selected from the group consisting of a $C_3$-$C_{20}$ linear, branched or cyclic diene, or an ethylene vinyl compound, such as vinyl acetate, and a compound represented by the formula $H_2C=CHR$ wherein R is a $C_1$-$C_{20}$ linear, branched or cyclic alkyl group or a $C_6$-$C_{20}$ aryl group. Examples of comonomers include propylene, 1-butene, 3-methyl-1-butene, 4-methyl-1-pentene, 3-methyl-1-pentene, 1-heptene, 1-hexene, 1-octene, 1-decene, and 1-dodecene.

In other embodiments, the polymer may be an alpha-olefin interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group. Examples of comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% by weight to about 25% by weight of the interpolymer. In one embodiment, a propylene-ethylene interpolymer is used.

Other examples of polymers which may be used in the present disclosure include homopolymers and copolymers (including elastomers) of an olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymers with N-methylol functional comonomers, ethylene-vinyl alcohol copolymers with N-methylol functional comonomers, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, polyolefins such as polypropylene, polyethylene, and copolymers thereof and blends thereof, as well as ethylene-propylene-diene terpolymers may be used. In some embodiments, the olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; heterogeneously branched linear ethylene/alpha olefin polymers; and high pressure, free radical polymerized ethylene polymers and copolymers such as low density polyethylene (LDPE).

In another embodiment, the polymers may include an ethylene-carboxylic acid copolymer, such as, ethylene-vinyl acetate (EVA) copolymers, such as those available under the tradename ELVAX (Dupont), ethylene-acrylic acid (EAA) and ethylene-methacrylic acid copolymers such as, for example, those available under the tradenames PRIMACOR™ from the Dow Chemical Company, NUCREL™ from DuPont, and ESCOR™ from ExxonMobil, and described in U.S. Pat. Nos. 4,599,392, 4,988,781, and 5,384,373, each of which is incorporated herein by reference in its entirety. Exemplary polymers include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor") blends of Ziegler-Natta PE and metallocene PE, such as products disclosed in U.S. Pat. Nos. 6,545,088, 6,538,070, 6,566,446, 5,844,045, 5,869,575, and 6,448,341. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil) may also be useful in some embodiments. Of course, blends of polymers may be used as well. In some embodiments, the blends include two different Ziegler-Natta polymers. In other embodiments, the blends may include blends of a Ziegler-Natta and a metallocene polymer. In still other embodiments, the thermoplastic resin used herein may be a blend of two different metallocene polymers.

In one particular embodiment, the polymer may comprise an alpha-olefin interpolymer of ethylene with a comonomer comprising an alkene, such as 1-octene. The ethylene and octene copolymer may be used in combination with another polymer, such as ethylene-acrylic acid copolymer. When present together, the weight ratio between the ethylene and octene copolymer and the ethylene-acrylic acid copolymer may be from about 1:10 to about 10:1, such as from about 3:2 to about 2:3. The polymer, such as the ethylene-octene copolymer, may have a crystallinity of less than about 21%, by weight. In some embodiments, the crystallinity of the polymer may be from 5 to 21 percent.

In other embodiments, polymers used in the foams described herein may have a crystallinity greater than about 21 percent. For example, polyolefins used in compositions described herein may have a crystallinity from greater than 21 weight percent to about 50 weight percent in some embodiments; from about 25 to about 40 weight percent in other embodiments. In a family of embodiments, compositions disclosed herein may include a mixture of polymers, where the mixture may include a polymer having a crystallinity of 21 weight percent or less and a polymer having a crystallinity of greater than 21 weight percent.

In one particular embodiment, the polymer may comprise at least one low density polyethylene (LDPE). The polymer may comprise LDPE made in autoclave processes or tubular processes. Suitable LDPE for this embodiment is defined elsewhere in this document.

In one particular embodiment, the polymer may comprise at least two low density polyethylenes. The polymer may comprise LDPE made in autoclave processes, tubular processes, or combinations thereof. Suitable LDPEs for this embodiment are defined elsewhere in this document.

In one particular embodiment, the polymer may comprise an alpha-olefin interpolymer of ethylene with a comonomer comprising an alkene, such as 1-octene. The ethylene and octene copolymer may be used in combination with another polymer, such as a low density polyethylene (LDPE). When present together, the weight ratio between the ethylene and octene copolymer and the LDPE may be from about 60:40 to about 97:3, such as from about 80:20 to about 96:4. The polymer, such as the ethylene-octene copolymer, may have a crystallinity of less than about 50%, such as less than about 25%. In some embodiments, the crystallinity of the polymer may be from 5 to 35 percent. In other embodiments, the crystallinity may range from 7 to 20 percent. Suitable LDPEs for this embodiment are defined elsewhere in this document.

In one particular embodiment, the polymer may comprise an alpha-olefin interpolymer of ethylene with a comonomer comprising an alkene, such as 1-octene. The ethylene and octene copolymer may be present alone or in combination with at least two other polymers from the group: low density polyethylene, medium density polyethylene, and high density polyethylene (HDPE). When present together, the weight ratio between the ethylene and octene copolymer, the LDPE, and the HDPE are such that the composition comprises one component from 3 to 97% by weight of the total composition and the remainder comprises the other two components. The polymer, such as the ethylene-octene copolymer, may have a crystallinity of less than about 50%, such as less than about 25%. In some embodiments, the crystallinity of the polymer may be from 5 to 35 percent. In other embodiments, the crystallinity may range from 7 to 21 percent.

Embodiments disclosed herein may also include a polymeric component that may include at least one multi-block olefin interpolymer. Suitable multi-block olefin interpolymers may include those described in U.S. Provisional Patent Application No. 60/818,911, for example. The term "multi-block copolymer" or refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The multi-block interpolymers may be characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the multi-block interpolymer obtained in preparative TREF, and $w_i$ is the weight percentage of the $i^{th}$ fraction.

Similarly, the square root of the second moment about the mean, hereinafter referred to as the second moment weight average block index, may be defined as follows:

$$2^{nd} \text{ moment weight average } BI = \sqrt{\frac{\sum(w_i(BI_i - ABI)^2)}{\frac{(N-1)\sum w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the $i^{th}$ fraction (preferably expressed in Kelvin), $P_X$ is the ethylene mole fraction for the $i^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$$LnP_{AB} = \alpha/T_{AB} + \beta$$

where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$. Conversely, $P_{XO}$ is the ethylene mole fraction for a random copolymer of the same composition and having an ATREF temperature of $T_X$, which may be calculated from Ln $P_{XO}=\alpha/T_X+\beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

Ethylene α-olefin multi-block interpolymers used in embodiments of the invention may be interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or non-conjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (such as cyclopentene, cyclohexene, and cyclooctene, for example).

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Properties of infill may benefit from the use of embodiments of the multi-block interpolymers, as compared to a random copolymer containing the same monomers and monomer content, the multi-block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α olefin, optionally comprising a $C_4$-$C_{20}$ diene, may be used.

Suitable non-conjugated diene monomers may include straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable polymers that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

The polymers (homopolymers, copolymers, interpolymers and multi-block interpolymers) described herein may have a melt index, $I_2$, from 0.01 to 2000 g/10 minutes in some embodiments; from 0.01 to 1000 g/10 minutes in other embodiments; from 0.01 to 500 g/10 minutes in other embodiments; and from 0.01 to 100 g/10 minutes in yet other embodiments. In certain embodiments, the polymers may have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the polymers may be approximately 1 g/10 minutes, 3 g/10 minutes or 5 g/10 minutes. In other embodiments, the polymers may have a melt index greater than 20 dg/min; greater than 40 dg/min in other embodiments; and greater than 60 dg/min in yet other embodiments.

The polymers described herein may have molecular weights, $M_w$, from 1,000 g/mole to 5,000,000 g/mole in some embodiments; from 1000 g/mole to 1,000,000 in other embodiments; from 10,000 g/mole to 500,000 g/mole in other embodiments; and from 10,000 g/mole to 300,000 g/mole in yet other embodiments. The density of the polymers described herein may be from 0.80 to 0.99 g/cm$^3$ in some embodiments; for ethylene containing polymers from 0.85 g/cm$^3$ to 0.97 g/cm$^3$; and in some embodiments between 0.87 g/cm$^3$ and 0.94 g/cm$^3$.

In some embodiments, the polymers described herein may have a tensile strength above 10 MPa; a tensile strength≥11 MPa in other embodiments; and a tensile strength ≥13 MPa in yet other embodiments. In some embodiments, the polymers described herein may have an elongation at break of at least 600 percent at a crosshead separation rate of 11 cm/minute; at least 700 percent in other embodiments; at least 800 percent in other embodiments; and at least 900 percent in yet other embodiments.

In some embodiments, the polymers described herein may have a storage modulus ratio, G'(25° C.)/G'(100° C.), from 1 to 50; from 1 to 20 in other embodiments; and from 1 to 10 in yet other embodiments. In some embodiments, the polymers may have a 70° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a heat of fusion of less than 85 J/g. In other embodiments, the ethylene/α-olefin interpolymer may have a pellet blocking strength of equal to or less than 100 pounds/foot$^2$ (4800 Pa); equal to or less than 50 lbs/ft$^2$ (2400 Pa) in other embodiments; equal to or less than 5 lbs/ft2 (240 Pa), and as low as 0 lbs/ft2 (0 Pa) in yet other embodiments.

In some embodiments, block polymers made with two catalysts incorporating differing quantities of comonomer may have a weight ratio of blocks formed thereby ranging from 95:5 to 5:95. The elastomeric interpolymers, in some embodiments, have an ethylene content of from 20 to 90 percent, a diene content of from 0.1 to 10 percent, and an α-olefin content of from 10 to 80 percent, based on the total weight of the polymer. In other embodiments, the multi-block elastomeric polymers have an ethylene content of from 60 to 90 percent, a diene content of from 0.1 to 10 percent, and an α-olefin content of from 10 to 40 percent, based on the total weight of the polymer. In other embodiments, the interpolymer may have a Mooney viscosity (ML (1+4) 125° C.) ranging from 1 to 250. In other embodiments, such polymers may have an ethylene content from 65 to 75 percent, a diene content from 0 to 6 percent, and an α-olefin content from 20 to 35 percent.

In certain embodiments, the polymer may be a propylene-ethylene copolymer or interpolymer having an ethylene content between 5 and 20% by weight and a melt flow rate (230° C. with 2.16 kg weight) from 0.5 to 300 g/10 min. In other embodiments, the propylene-ethylene copolymer or interpolymer may have an ethylene content between 9 and 12% by weight and a melt flow rate (230° C. with 2.16 kg weight) from 1 to 100 g/10 min.

In some particular embodiments, the polymer is a propylene-based copolymer or interpolymer. In some embodiments, a propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. In other particular embodiments, the ethylene-α olefin copolymer may be ethylene-butene, ethylene-hexene, or ethylene-octene copolymers or interpolymers. In other particular embodiments, the propylene-α olefin copolymer may be a propylene-ethylene or a propylene-ethylene-butene copolymer or interpolymer.

The polymers described herein (homopolymers, copolymers, interpolymers, multi-block interpolymers) may be produced using a single site catalyst and may have a weight average molecular weight of from about 15,000 to about 5 million, such as from about 20,000 to about 1 million. The molecular weight distribution of the polymer may be from about 1.01 to about 80, such as from about 1.5 to about 40, such as from about 1.8 to about 20.

In some embodiments, the polymer may have a Shore A hardness from 30 to 100. In other embodiments, the polymer may have a Shore A hardness from 40 to 90; from 30 to 80 in other embodiments; and from 40 to 75 in yet other embodiments.

The olefin polymers, copolymers, interpolymers, and multi-block interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an olefin polymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of which are incorporated herein by reference in their entirety. One particularly useful functional group is maleic anhydride.

The amount of the functional group present in the functional polymer may vary. The functional group may be present in an amount of at least about 0.1 weight percent in some embodiments; at least 0.5 weight percent in other embodiments; 1.0 weight percent in some embodiments; at least about 5 weight percent in other embodiments; and at least about 7 weight percent in yet other embodiments. The functional group may be present in an amount less than about 35 weight percent in some embodiments; less than about 30 weight percent in other embodiments; and less than about 25 weight percent in yet other embodiments.

Additives

If desired, fillers, colorants, light and heat stabilizers, antioxidants, acid scavengers, flame retardants, processing aids, extrusion aids, and foaming additives may be used in making the foam. The foam of the invention may contain filler materials in amounts, depending on the application for which they are designed, ranging from about 20-100 percent (dry basis) of the weight of the polymer component. These optional ingredients may include, but are not limited to, calcium carbonate, titanium dioxide powder, polymer particles, hollow glass spheres, polymeric fibers such as polyolefin based staple monofilaments and the like.

For example, additives may include a wetting agent, fire retardants, surfactants, anti-static agents, anti block agents, wax-based dispersions, pigments, neutralizing agents, thickeners, compatibilizers, brighteners, rheology modifiers, biocides, fungicides, reinforcing fibers, and other additives known to those skilled in the art. While optional for purposes of the present invention, other components may be highly advantageous for product stability during and after the manufacturing process.

Additives may be included in any formulation comprising the above described polymers, copolymers, interpolymers, and multi-block interpolymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the present disclosure. Thermoplastic compositions according to other embodiments of the present disclosure may also contain organic or inorganic fillers or other additives such as starch, talc, calcium carbonate, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane-based or other coupling agents may also be employed for better filler bonding.

The foams, polymers, and polymer blend compositions described above may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of processing oils, plasticizers, and/or processing aids per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

For conventional TPO, TPV, and TPE applications, carbon black is one additive useful for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present polymers and blends thereof require little or no carbon black, thereby allowing considerable design freedom to include alternative pigments or no pigments at all.

Compositions, including thermoplastic blends according to embodiments disclosed herein may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are WINGSTAY™ S antioxidant, POLYSTAY™ 100 antioxidant, POLYSTAY™ 100 AZ antioxidant, POLYSTAY™ 200 antioxidant, WINGSTAY™ L antioxidant, WINGSTAY™ LHLS antioxidant, WINGSTAY™ K antioxidant, WINGSTAY™ 29 antioxidant, WINGSTAY™ SN-1 antioxidant, and IRGANOX™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include TINUVIN™ 123, TINUVIN™ 144, TINUVIN™ 622, TINUVIN™ 765, TINUVIN™ 770, and TINUVIN™ 780, available from Ciba Specialty Chemicals, and CHEMISORB™ T944, available from Cytex Plastics, Houston Tex., USA. A Lewis acid may be additionally included with a HALS compound in order to achieve superior surface quality, as disclosed in U.S. Pat. No. 6,051,681. Other embodiments may include a heat stabilizer, such as IRGANOX™ PS 802 FL, for example.

For some compositions, additional mixing processes may be employed to pre-disperse the heat stabilizers, anti-oxidants, anti-ozonants, carbon black, UV absorbers, and/or light stabilizers to form a masterbatch, and subsequently to form polymer blends therefrom.

In some embodiments, additives may also include processing aids such as stearates and stearic acids, perfumes, algae inhibitors, anti-microbiological and anti-fungus agents, flame retardants and halogen-free flame retardants, as well as slip and anti-block additives. Other embodiments may include PDMS to decrease the abrasion resistance of the polymer. Adhesion of the polymer may also be improved through the use of adhesion promoters or functionalization or coupling of the polymer with organosilane, polychloroprene (neoprene), or other grafting agents.

Curing Agents

Suitable crosslinking agents (also referred to as curing or vulcanizing agents) for use herein include silane based compounds, sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729. One example of a peroxide curing agent is PERKADOX 14-40bd, available from Akzo Nobel.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5 phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the polymer composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 weight percent, as measured using xylene extractables; at least 30 weight percent gel in other embodiments; and up to 90 weight percent gel in yet other embodiments.

Blowing Agent and Related Additives

Blowing agents suitable for use in forming the foams described herein may be physical blowing agents, which are typically the same material as the fugitive gas, e.g., $CO_2$, or a chemical blowing agent, which produces the fugitive gas. More than one physical or chemical blowing agent may be used and physical and chemical blowing agents may be used together.

Physical blowing agents useful in the present invention include any naturally occurring atmospheric material which is a vapor at the temperature and pressure at which the foam exits the die. The physical blowing agent may be introduced, i.e., injected into the polymeric material as a gas, a supercritical fluid, or liquid, preferably as a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Non-flammable, non-toxic, non-ozone depleting blowing are preferred because they are easier to use, e.g., fewer environmental and safety concerns, and are generally less soluble in thermoplastic polymers. Suitable physical blowing agents include, e.g., carbon dioxide, nitrogen, $SF_6$, nitrous oxide, perfluorinated fluids, such as $C_2F_6$, argon, helium, noble gases, such as xenon, air (nitrogen and oxygen blend), and blends of these materials.

Chemical blowing agents that may be used in the present invention include, e.g., a sodium bicarbonate and citric acid blend, dinitrosopentamethylenetetramine, p-toluenesulfonyl hydrazide, 4-4'-oxybis(benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride. Preferably, the blowing agents are, or produce, one or more fugitive gases having a vapor pressure of greater than 0.689 MPa at 0° C. CELOGEN AZ130 is an azodicarbonamide chemical blowing agent commercially available from Uniroyal Chemical Co., Middleburry, Conn.

The total amount of the blowing agent used depends on conditions such as extrusion-process conditions at mixing, the blowing agent being used, the composition of the extrudate, and the desired density of the foamed article. The extrudate is defined herein as including the blowing agent blend, a polyolefin resin(s), and any additives. For a foam having a density of from about 1 to about 15 lb/ft$^3$, the extrudate typically comprises from about 18 to about 1 wt % of blowing agent. In other embodiments, 1% to 10% of blowing agent may be used.

The blowing agent blend used in the present invention comprises less than about 99 mol % isobutane. The blowing agent blend generally comprises from about 10 mol % to about 60 or 75 mol % isopentane. The blowing agent blend more typically comprises from about 15 mol % to about 40 mol % isopentane. More specifically, the blowing agent blend comprises from about 25 or 30 mol % to about 40 mol % isobutane. The blowing agent blend generally comprises at least about 15 or 30 mol % of co-blowing agent(s). More specifically, the blowing agent blend comprises from about 40 to about 85 or 90 mol % of co-blowing agent(s). The blowing agent blend more typically comprises from about 60 mol % to about 70 or 75 mol % of co-blowing agent(s).

A nucleating agent or combination of such agents may be employed in the present invention for advantages, such as its capability for regulating cell formation and morphology. A nucleating agent, or cell size control agent, may be any conventional or useful nucleating agent(s). The amount of nucleating agent used depends upon the desired cell size, the selected blowing agent blend, and the desired foam density. The nucleating agent is generally added in amounts from about 0.02 to about 20 wt % of the polyolefin resin composition.

Some contemplated nucleating agents include inorganic materials (in small particulate form), such as clay, talc, silica, and diatomaceous earth. Other contemplated nucleating agents include organic nucleating agents that decompose or react at the heating temperature within an extruder to evolve gases, such as carbon dioxide, water, and/or nitrogen. One example of an organic nucleating agent is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents may be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer such as polyethylene). Talc may be added in a carrier or in a powder form.

Gas permeation agents or stability control agents may be employed in the present invention to assist in preventing or inhibiting collapsing of the foam. The stability control agents suitable for use in the present invention may include the partial esters of long-chain fatty acids with polyols described in U.S. Pat. No. 3,644,230, saturated higher alkyl amines, saturated higher fatty acid amides, complete esters of higher fatty acids such as those described in U.S. Pat. No. 4,214,054, and combinations thereof described in U.S. Pat. No. 5,750,584.

The partial esters of fatty acids that may be desired as a stability control agent include the members of the generic class known as surface active agents or surfactants. A preferred class of surfactants includes a partial ester of a fatty acid having 12 to 18 carbon atoms and a polyol having three to six hydroxyl groups. More preferably, the partial esters of a long chain fatty acid with a polyol component of the stability control agent are glycerol monostearate, glycerol distearate or mixtures thereof. It is contemplated that other gas permeation agents or stability control agents may be employed in the present invention to assist in preventing or inhibiting collapsing of the foam.

Scorch Retarder

Examples of scorch retarders that may be used in embodiments disclosed herein include maleic anhydride, salicylic acid, bis triethoxy silyl ethane, N-cyclohexyl-2-benzothiazole sulfenamide, hydroquinone monomethyl ether, and others as may be known in the art. Commercially available scorch retarders may include H-TEMPO, available from AH Marks, and HP136, available from Ciba.

Elastomeric Foams

Foam sheets according to embodiments disclosed herein may include a single layer or multiple layers as desired. The foam articles may be produced in any manner so as to result in at least one foam layer. The foam layers described herein may be made by a pressurized melt processing method such as an extrusion method. The extruder may be a tandem system, a single screw extruder, a twin screw extruder, etc. The extruder may be equipped with multilayer annular dies, flat film dies and feedblocks, multi-layer feedblocks such as those disclosed in U.S. Pat. No. 4,908,278 (Bland et al.), multi-vaned or multi-manifold dies such as a 3-layer vane die available from Cloeren, Orange, Tex. A foamable composition may also be made by combining a chemical blowing agent and polymer at a temperature below the decomposition temperature of the chemical blowing agent, and then later foamed. In some embodiments, the foam may be coextruded with one or more barrier layers.

One method of producing the foams described herein is by using an extruder, as mentioned above. In this case, the foamable mixture (polymer, filler, blowing agent, etc., as desired) is extruded. As the mixture exits an extruder die and upon exposure to reduced pressure, the fugitive gas nucleates and forms cells within the polymer to create a foam article. The resulting foam article may then be deposited onto a temperature-controlled casting drum. The casting drum speed (i.e., as produced by the drum RPM) can affect the overall thickness of the foam article. As the casting roll speed increases, the overall thickness of the foam article can decrease. However, the barrier layer thickness at the die exit, which is where foaming occurs, is the diffusion length for the system. As the foam article is stretched and quenched on the casting drum, the barrier layer thickness may decrease until the foam article solidifies. In other words, it is the barrier layer diffusion length (i.e., thickness) at the die exit that is the important factor in controlling the diffusion of the fugitive gas.

A second method of producing foams described herein may include compounding or melt kneading of the components (polymers, fillers, blowing agent, etc., as desired), such as in an extruder or melt kneader, to form an expandable composition. The expandable composition may then be injection molded into a hot mold, such as by using a MAIN Group S.P.A. injection molding machine for crosslinked foams, model E166S. Following injection of the mixture into the mold, the mold temperature may be raised to and/or maintained at a temperature sufficient to decompose the blowing agent. The mold may then be opened to allow for sudden bubble nucleation and foam expansion. Expansion of the foam plaques thus formed may be in the range of about 60 percent after 24 hours.

Foams formed by the above described methods may be crosslinked using a peroxide curing agent in some embodiments. In other embodiments, the foams may be crosslinked using a heat activated curing system. Heat activated curing systems may include at least one based on sulfur or an epoxy. Heat activated curing systems and peroxide curing agents may be combined with the other components during processing to provide for the crosslinking of the foams. In some embodiments, the foams may be crosslinked using a radiation induced curing system. Radiation activated curing may include at least one of e-beaming and gamma radiation. Radiation activated curing may be performed, in some embodiments, after the formation of a foam by the above-described methods.

One skilled in the art will appreciate that other methods of producing the foams disclosed herein may also be used.

Crosslinked Foams with High Filler Loadings

Crosslinked foams having high filler loadings, according to embodiments disclosed herein, may be formed using the following components:

A. a polyolefin having a crystallinity of 21 percent or less, an ethylene vinyl acetate copolymer having a vinyl acetate content of less than 15 mole percent, or a combination thereof;

B. a polyolefin having a viscosity between 500 and 20,000 cP, as measured using ASTM D1084 (Brookfield Viscosity at 350° F.); and C. a filler, wherein the crosslinked foam includes from 10 to 80 parts filler per hundred parts of components A, B, and C, by weight.

In other embodiments, the crosslinked foam may optionally include one or more of:

D. at least one polyolefin having a crystallinity of greater than 21 weight percent, an ethylene vinyl acetate copolymer having a vinyl acetate content of 15 mole percent or greater, or a combination thereof; and E. a scorch retarder.

In other embodiments, the crosslinked foam may include 20 to 80 parts filler per hundred parts of components A, B, and C, by weight; 25 to 80 parts filler per hundred parts of components A, B, and C, by weight, in other embodiments; 30 to 80 parts filler per hundred parts of components A, B, and C, by weight, in other embodiments; and 40 to 80 parts filler per hundred parts of components A, B, and C, by weight, in yet other embodiments. Fillers may include those as described above (see "Additives"), such as calcium carbonate. Fillers may also include polymer regrind.

In a family of embodiments, the crosslinked foams may include:
i. 20 to 80 weight percent of component A;
ii. 25 to 75 weight percent of component B;
iii. greater than 0 to 6 weight percent of component C;
iv. greater than 0 to 1 weight percent of component D; and
v. 5 to 50 weight percent of component E;
where the above weight percentages are based on the total weight of components A, B, C, D, and E.

In another family of embodiments, the crosslinked foams may include:
vi. 40 to 60 weight percent of component A;
vii. 40 to 60 weight percent of component B;
viii. 2.5 to 4 weight percent of component C;
ix. 0.25 to 0.5 weight percent of component D; and
x. 20 to 35 weight percent of component E;
where the above weight percentages are based on the total weight of components A, B, C, D, and E.

Additionally, crosslinked foams disclosed herein may include blowing agents or decomposition products thereof. In some embodiments, the blowing agents or decomposition products thereof may be present (prior to and/or after formation of the crosslinked foam compositions disclosed herein) in an amount ranging from about 1 to about 5 weight percent, based on the total weight of components A-E and the blowing agent; from about 2 to about 3 weight percent in other embodiments.

The crosslinked foams disclosed herein may be crosslinked using a peroxide curing agent. In other embodiments, at least a portion of components A, B, and C may be crosslinked using a heat activated curing system or a radiation induced curing system. Heat activated curing systems may include at least one based on sulfur or an epoxy. Radiation activated curing system may include at least one of e-beaming and gamma radiation. For example, where a peroxide curing agent is used, the peroxide may be used in an amount ranging from about 1 to about 5 weight percent of the composition, based on the total weight of components A-E, the blowing agent, and the peroxide; from about 1 to about 2.5 weight percent in other embodiments.

In selected embodiments, foams useful for disclosed embodiments may have thickness between 1 and 500 mm; in other embodiments, from 5 to 100 mm; in other embodiments, from 8 to 30 mm; and in yet other embodiments, from 10 to 20 mm. In selected embodiments foams may have a density in the range from about 20 to 600 kg/m$^3$; from 25 to 500 kg/m$^3$ in other embodiments; from 50 to 350 kg/m$^3$ in other embodiments; from 120 to 350 kg/m$^3$ in other embodiments; and from 150 to 300 kg/m$^3$ in yet other embodiments. In selected embodiments, foams may have a cell size in the range from about 0.1 to 6 mm; from 0.2 to 4.5 mm in other embodiments; and from 0.2 to 3 mm in yet other embodiments.

Crosslinked foams disclosed herein may have a low open cell volume, so as to avoid water uptake. In some embodiments, crosslinked foams disclosed herein may have an open cell volume of 35% or less; 30 percent or less in other embodiments; and 25 percent or less in yet other embodiments.

In some embodiments, the foam layer may be perforated in order to facilitate drainage. Drainage may be required such that in the event of rain or other wetting of an artificial turf including a foam as disclosed herein, water may drain off of the playing surface.

In some embodiments, the above described foams may be used as a shock absorbing layer in a synthetic turf. Additionally, tests may be performed to analyze temperature performance and aging, as well as the bounce and spin properties of the resulting turf. Briefly, the significant tests and desired results for artificial turf performance as specified by the FIFA Quality Concept Manual (March 2006 Edition) are shown in the below table. Those having ordinary skill in the art will appreciate that this is but one use of the foams described herein, and that the artificial turf and foams described herein may be useful in a number of other applications an a number of other sports, such as rugby and field hockey, for example.

| | | | LABORATORY TESTS - BALL/SURFACE INTERACTION | | | Requirements | |
| | | | | | | FIFA Recommended** | FIFA |
| | | Test | Test Conditions | | | | |
| Property | Test Method | Method | Preparation | Temperature | Condition | (best ranking) | Recommended* |
| Vertical ball rebound | FIFA 01/05-01 & FIFA 09/05-01 | | Pre-conditioning | 23° C. | Dry | 0.60 m-0.85 m | 0.60 m-1 m |
| | | | | | Wet | | — |
| | | | Simulated Wear | 23° C. | Dry | | 0.60 m-1 m |
| Shock absorption | FIFA 04/05-01 & FIFA 10/05-01 | Flat foot Mean 2$^{nd}$/3$^{rd}$ impact | Pre-conditioning | 23° C. | Dry | 60%-70% | 55%-70% |
| | | | | | Wet | | — |
| | | | Simulated Wear | 23° C. | Dry | | 55%-70% |
| | | | — | 40° C. | Dry | | — |
| | | Flat foot 1$^{st}$ impact | — | −5° C. | Frozen | 60%-70% | — |
| Vertical deformation | FIFA 05/05-01 & FIFA 10/05-01 | Flat foot Mean 2$^{nd}$/3$^{rd}$ impact | Pre-conditioning | 23° C. | Dry | 4 mm-8 mm | 4 mm-9 mm |
| | | | | | Wet | | — |
| | | | Simulated Wear | 23° C. | Dry | | 4 mm-9 mm |

In a family of embodiments, crosslinked foams disclosed herein may have properties sufficient to meet FIFA one-star requirements. In another family of embodiments, crosslinked foams disclosed herein may have properties sufficient to meet FIFA two-star requirements.

Shock Absorption

Principle: A mass (20 Kgs) falls, as discussed in the FIFA Quality Concept Manual (March 2006 Edition), which is incorporated by reference in its entirety. The maximum force applied is recorded. The % reduction in this force relative to the maximum force measured on a concrete surface is reported as "Force Reduction." The FIFA requirements for force reduction are as follows:

FIFA 2 Star: 60%-70%
FIFA 1 Star: 55%-70%

Vertical Deformation

Principle A mass is allowed to fall onto a spring that rests and the maximum deformation of the surface is determined. The FIFA requirements for vertical deformation are as follows:

FIFA 2 Star: 4 mm-8 mm
FIFA 1 Star: 4 mm-9 mm

EXAMPLES

In the following examples, compositions may include a green masterbatch, used to add color to the resulting composition or product. All references to "green masterbatch" are to a composition having the following formulation:

| Component | Description | Amount (wt. %) |
|---|---|---|
| Carrier | Low density PE, I₂ = 9 dg/min | 65 |
| Pigment | YE42 (iron oxide) | 35 |
| Pigment | GN7 (talocianine) | |
| Pigment | BK7 (carbon black) | |

Samples 1-9

The usefulness of polyolefin resins having selected foam densities and high filler loadings is investigated. Specifically, a number of polyethylene resins, commercially available from The Dow Chemical Company, Midland, Mich. are studied. Table 1 show a number of the formulations that are used to produce crosslinked foam shockpads having a 10 mm thickness. The stearic acid is LOXIOL G20, and the calcium carbonate is OMYALITE 95T.

Screening data suggest that foam at 200 kg/m3 and 10 mm thickness meet the desired FIFA standards. Mechanical properties for foams made from the formulations presented in Table 1 are given in Table 2. The performance of the crosslinked polyethylene foams for use as shockpads, the results of which are presented in Table 3. Sample testing is performed as follows.

Density is measured according to the Archimedes method for the density of foamed sheets. Hardness is measured according to ISO 868 (Shore A/3 sec). Shrinkage is measured according to SATRA PM70 (70° C./1 h). Compression set is measured according to SATRA TM64 (50%/23° C./24 h-50%/50° C./6 h).

Samples 2.5 to 5 cm wide by 5 cm deep are cut from sheets of the foam. To measure compressive stress-strain behavior, the samples are inserted between the centers of the compressive plates. The thickness direction of the foam is aligned parallel to crosshead movement. A pre-load of 2.5 N was applied at 5 mm/min, and the crosshead position is re-zeroed. The sample is then compressed at 10 mm/min until the load approached the capacity of the load cell. Stress is calculated by dividing the measured compressive force by the product of the width and depth of the foam. Stress is quantified in units of megapascals (MPa). Strain in terms of percent is calculated by dividing the crosshead displacement by the starting thickness of the foam and multiplying by one hundred.

To measure the compressive hysteresis behavior, a foam sample is loaded into the Instron in the same manner as above. A pre-load of 2.5N is applied at 5 mm/min, and the crosshead position is re-zeroed. Then the sample is compressed at 10 mm/min until the stress reaches 0.38 MPA, designated as the compression step. Immediately, the crosshead is then reversed until a load of 0.0038 MPa is reached, designated as decompression. Without interruption, the sample is compressed and decompressed for 10 cycles.

To measure the compressive creep behavior, a foam sample is loaded into the Instron in the same manner as above, except that the environmental chamber is in place and preheated to a temperature of 65° C. The sample is placed in between the compression plates, at 65° C. After allowing the foam sample to equilibrate inside the chamber for one hour, a pre-load of

TABLE 1

| | Sample No. | | | | | | | | |
|---|---|---|---|---|---|---|---|---|---|
| Component | 1 parts by weight | 2 parts by weight | 3 parts by weight | 4 parts by weight | 5 parts by weight | 6 parts by weight | 7 parts by weight | 8 parts by weight | 9 parts by weight |
| ENGAGE ENR 7256 | 60 | 60 | 60 | 60 | 80 | 40 | 20 | 0 | 0 |
| LDPE PG 7004 | 40 | 40 | 40 | 40 | 20 | 60 | 80 | 100 | 0 |
| LDPE 302E | 0 | 0 | 0 | 0 | 0 | 0 | 0 | 0 | 100 |
| AFFINITY GA 1900 | 5 | 5 | 5 | 5 | 5 | 5 | 5 | 5 | 5 |
| H-TEMPO | 0.5 | 0.5 | 0.5 | 0.5 | 0.5 | 0.5 | 0.5 | 0.5 | 0.5 |
| PERKADOX 14-40 | 2.5 | 2.5 | 2.5 | 2.5 | 2.5 | 2.5 | 2.5 | 2.5 | 2.5 |
| CELOGEN AZ130 | 3.6 | 3.6 | 3.6 | 3.6 | 3.6 | 3.6 | 3.6 | 3.6 | 3.6 |
| Zinc Oxide | 2 | 2 | 2 | 2 | 2 | 2 | 2 | 2 | 2 |
| Stearic Acid | 0.1 | 0.1 | 0.1 | 0.1 | 0.1 | 0.1 | 0.1 | 0.1 | 0 |
| Calcium Carbonate | 40 | 60 | 80 | 100 | 60 | 60 | 60 | 60 | 60 |
| Green MasterBatch | 3 | 3 | 3 | 3 | 3 | 3 | 3 | 3 | 3 |
| Total parts | 156.7 | 176.7 | 196.7 | 2167 | 176.7 | 176.7 | 176.7 | 176.7 | 176.6 |

2.5 N is applied at 5 mm/min, and the crosshead position is re-zeroed. Load is then applied at 0.16 MPa. Crosshead position is then adjusted automatically by the Instron computer, to maintain a stress of 0.16 MPa for 12 hours. Compressive strain versus time is measured, the results of which are presented in FIGS. 3 and 3c. After 12 hours, the crosshead returns to its starting position. After another two hours, the foam is removed and allowed to cool to ambient conditions (20° C., 50% relative humidity). The foam thickness is then re-measured. The corresponding strain is designated "strain at release, 2 hr." The compressive creep behavior test results are presented in FIG. 4.

To measure the energy absorption behavior of the foams FIFA quality concept methodology as described in the "March 2006 FIFA Quality Concept Requirements for Artificial Turf Surfaces," the FIFA handbook of test methods and requirements for artificial football turf, which is fully incorporated herein by reference.

TABLE 2

Sample No.

| | 1 | 2 | 3 | 4 | 5 | 6 | 7 | 8 | 9 |
|---|---|---|---|---|---|---|---|---|---|
| Density (g/cc) | 0.1342 | 0.1473 | 0.1619 | 0.1742 | 0.1599 | 0.1404 | 0.1273 | 0.1258 | 0.1428 |
| Shore A (w. skin), 3 sec. | 31.3 | 31.6 | 33.3 | 34.6 | 29.7 | 25.9 | 38.5 | 42.4 | 49.4 |
| % Shrinkage at 70° C., 1 hour | 3.2 | 2.9 | 2.6 | 2.1 | 4.3 | 1.6 | 1.1 | 0.7 | 1.1 |
| Compression Set at Room Temperature (24 hours) | 50.1 | 51.1 | 52.2 | 52.3 | 54.2 | 47.9 | 47 | 42.4 | 38.6 |

TABLE 3

Performance of Shockpad

Sample No.

| | 1 | 2 | 3 | 4 | 5 | 6 | 7 | 8 | 9 |
|---|---|---|---|---|---|---|---|---|---|
| Shock Absorption, Force Reduction (%) | 52 | 49 | 51 | 50 | 48 | 52 | 53 | 53 | 51 |
| Elastic Recovery (%) | 52 | 52 | 49 | 47 | 58 | 45 | 41 | 39 | 38 |
| Vertical Deformation (%) | 6.1 | 5.8 | 5.4 | 5.1 | 6.1 | 5.1 | 4.5 | 3.8 | 3.3 |

Synthetic turf, using embodiments of the present invention, is shown in FIG. 1. Specifically, a crosslinked polythene foam having a high filler loading is provided as a shock absorption layer, which may be bonded to a backing. Artificial grass is attached to the backing, and the spaces between the grass may be filled with an infill. In addition, embodiments of the present invention may be useful for any field that may use artificial turf, such as rugby and field hockey.

The performance of the crosslinked polyethylene foams for use in an artificial turf system is also investigated, the results of which are presented in Table 4. Sample testing is performed as described above.

TABLE 4

Performance of Foams in Turf System

Sample No.

| | 2 | 3 | 4 | 5 | 7 | 9 |
|---|---|---|---|---|---|---|
| Shock Absorption, Force Reduction (%) | 64 | 63 | 62 | 65 | 62 | 54 |

TABLE 4-continued

Performance of Foams in Turf System

Sample No.

| | 2 | 3 | 4 | 5 | 7 | 9 |
|---|---|---|---|---|---|---|
| Elastic Recovery (%) | 45 | 44 | 45 | 48 | 42 | 46 |
| Vertical Deformation (%) | 6.2 | 5.9 | 5.9 | 6.8 | 5 | 4 |

Tables 2 and 3 above summarize the effect of ENGAGE/LDPE/filler levels on the properties of the resulting shockpads. If ENGAGE is 80 phr or greater (Sample 5), then vertical deformation is too high (a bouncy foam). If no ENGAGE is present (Samples 8 and 9), the foam is too hard and permanently deforms after the first impact. Samples 1-4 and 6-7 perform well in the application according to the FIFA tests.

Cyclic loading tests are performed in stress-controlled mode to simulate repeated loads of 0.9 MPa which is similar to the load applied by the FQC tests. A high strain rate of about 120 min$^{-1}$ is used. Cyclic loading tests are performed on an MTS 810 (available from MTS Systems Corporation, Eden Prairie, Minn.), 100 kN load frame, equipped with a controller and a data acquisition card. A linear variable differential transformer (LVDT) (−150 to +150 mm) calibrated in the 0.5 mm range is used to measure sample displacement. A load cell (MTS 25 kN), calibrated in the 10 kN range is used to measure load applied to the sample. The contactor (the load piston applying the load to the sample) is a rounded cylinder 70 mm in diameter having a hemispherical radius of curvature of 500 mm. Once the sample is in place, the load piston is moved as close to the sample as possible to determine the zero position, from which deformation is measured. The zero position is determined where a load of 200 N is placed on the sample (20 kg mass resting on the sample, comparable to the FIFA zeroing method). The sample is then displaced to a desired load, such as 3500 N, total displacement is measured, the load is withdrawn from the sample, and the energy stored and released from the sample is calculated. The loading and unloading is repeated at a selected frequency, such as 1/s, for a desired number of cycles. Because of permanent displacement and changes in displacement over numerous cycles, the loading during each cycle is performed in a regulated manner so as not to overload the sample. The cyclic loading tests may be performed at any temperature in the range from about 15° C. to about 70° C., and are performed at room temperature and at 55° C. in these experiments.

Cyclic loading tests, as described above, provide insights into the permanent indentation and release energy of the foam sample after repeated shocks at high strain rates. The performance of the foam of Sample 6 is compared to non-crosslinked foams (both at room temperature) in FIG. 2.

Figure 2:
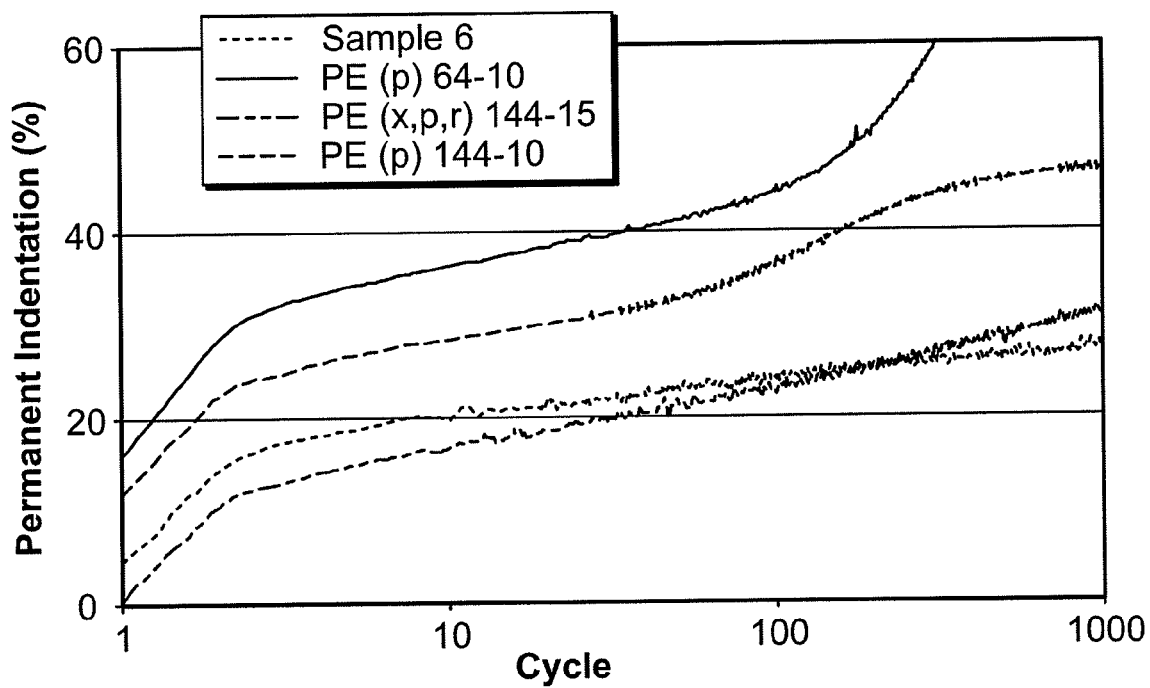
FIG. 2 graphically compares cyclic loading test results for crosslinked foams according to embodiments disclosed herein with results for comparative foam samples.

As shown in FIG. 2, foam density is a key parameter driving the permanent indentation, with an non-crosslinked PE foam with 64 kg/m³ density "PE(p) 64-10" collapsing and not able to reach 0.9 MPa after 200 cycles while "PE(p) 144-10" (uncrosslinked PE foam with 144 kg/m³ density) lasting longer. The foam formed from Sample 6 shows less permanent indentation, reaching a plateau after 1200 cycles. Foam sample PE(x,p,r) 144-15 is a foam sample commercially available and currently being installed in pitches. Thus Sample 6 performs similar or better than each of the comparative foam samples (the lower the permanent indentation, the better the foam is for the application), especially after a high number of cycles.

Samples 10-12 and Comparative Sample 13

Formulations and Materials: Samples 10-12 are based on polymer blends of LLDPE plastics and LLDPE elastomers. Polyethylenes and other materials used to form the foams of Samples 10-12 are as stated below. In addition, Comparative Sample 13 is formed from an EVA compound. Table 5 shows different formulations for crosslinked foams including their measured material properties on injection molded test plaques. These Samples show a variation in filler level.

Materials used to form the foams of Samples 10-12 and Comparative Sample 13 are as follows: DOWLEX 2035G, an LLDPE having a density of about 0.919 g/cc, and a Melt Index of about 6; DOWLEX 2045S, an LLDPE having a density of about 0.920 g/cc and a melt index of about 1; ENGAGE 8100, an LLDPE elastomer having a density of about 0.870 g/cc and a melt index of about 1; ENGAGE ENR 7256, an LLDPE elastomer having a density of about 0.885 g/cc and a melt index of about 2; AFFINITY GA 1900, a low molecular weight polyolefin having a density of about 0.870 g/cc and a Brookfield Viscosity at 350° F. (ASTM D1084) of about 8200 cP; each of the above resins is available from The Dow Chemical Company, Midland, Mich. Other materials include: ELVAX 460, an ethylene vinyl acetate copolymer having about 18% vinyl acetate (available from DuPont, density 0.941 g/cc, 2.5 Melt Index); PERKADOX® 14-40b-pd, a peroxide curing agent, 40% on carrier (available from AkzoNobel, provided by Hercules, Wilmington, Del.); CELOGEN® AZ130, an azodicarbonamide chemical blowing agent available from Uniroyal Chemical Co., Middlebury, Conn.; Zinc Oxide (ZnO), a blowing agent kicker (100% active) available from Schweizerhall Chemie AG, Basel, Switzerland; H-TEMPO, a processing aid and scorch retarder, 4-hydroxy-2,2,6,6-tertramethylpiperidine-N-oxyl, available from A.H. Marks and Company Ltd.; LOXIOL® G20, stearic acid, a processing aid, available from Cognis, Germany; and OMYALITE® 95T, a mineral filler, surface treated calcium carbonate ($CaCO_3$) available from Omya Inc., Florence, Italy.

Compounding of materials for Samples 10-12 and Comparative Sample 13 is performed with a BUSS Kneader, Model MDK, equipped with a 46 mm diameter screw of 15 L/D ratio by mixing the ingredients as given in Table 5. The screw temperature is set at 50° C., while the three heating zones were set at 70, 75 and 75° C. The polymer is fed from the first feeding port, while all other ingredients are added through the second feeding port further downstream. The throughput rate is set to 10 kg/h. The highest polymer temperature recorded during compounding is 140° C. The melt stream emerging from the compounder is pelletized using a hot-blade cutter.

Consecutively, foams are prepared by injection molding into a hot mold using a MAIN group S.P.A. injection molding machine for crosslinked foams, model E166S, equipped with a rectangular mold of 22×15×0.8 cm in size. For injection, the injector screw barrel is set at a temperature of 110, 115, 120, and 130 C for zones 1, 2, 3, and 4, respectively. The mold temperature is kept at 185° C. with the mold providing a clamping force of 1500 kN.

After injection the melt is kept in the mold for a specific period of time to allow for curing of the crosslinkable composition and decomposition of the blowing agent. Samples remain in the mold from 4 to 12 minutes curing time as given in Table 5. By opening the mold, which allows for sudden bubble nucleation and foam expansion, the foam plaques are ejected. The foams are then cooled at room conditions. Desired expansion of the foam plaques lies at 60±2% after 24 h. Properties of the foams are measured no earlier than 48 hours day after molding. The properties of foams are measured with methods described in Table 6, and the results of the measurements are given in Table 7.

TABLE 5

Sample Formulations [phr]

| | Comparative Sample 13 | Sample 10 | Sample 11 | Sample 12 |
|---|---|---|---|---|
| Elvax 460 | 100 | | | |
| Engage 8100 | | | | 50 |
| Dowlex 2035E | | | | 50 |
| Engage ENR 7256 | | 60 | 40 | |
| Dowlex 2045S | | 40 | 60 | |
| Affinity GA 1900 | | 5 | 5 | |
| Perkadox 14-40 | 1.8 | 2.5 | 2.9 | 1.4 |
| Celogen AZ130 | 2.4 | 3.6 | 3.5 | 2.25 |
| ZnO | 3 | 2 | 2 | 3 |
| H-Tempo | 0.25 | 0.5 | 0.75 | |
| Loxiol G20 | 0.1 | 0.1 | 0.1 | 0.2 |
| Omyalite 95T | 5 | 60 | 30 | 10 |
| Curing time [min] | 10 | 4 | 12 | 16 |

TABLE 6

Sample Testing Methods

| Physical Property | Method |
|---|---|
| Density (g/cc) | ASTM D 3575/W/B |
| Shore A, 3 s | ISO 868 |
| Abrasion [mm³] | ISO 4649/DIN 53516 |
| % Shrinkage at 50° C., 24 h | Satra PM70 |
| % Shrinkage at 75° C., 6 h | Satra PM70 |
| Compression Set at Room Temperature (RT)/50° C./75° C., 50%, 24 h | Satra TM64 |
| Split Tear [N/mm] | Satra TM65 |
| Rebound Resiliency | Ball method |
| Tensile [MPa], Elongation [%] | ASTM D-412 |

TABLE 7

Physical Properties of Example Formulations

| Physical properties | Comparative Sample 13 | Sample 10 | Sample 11 | Sample 12 |
|---|---|---|---|---|
| Density (g/cc) | 0.26 | 0.26 | 0.246 | 0.228 |
| Shore A (w. skin), 3 sec | 51.8 | 49.6 | 54.7 | 46.8 |
| Abrasion [mm^3] (w. skin) | 380 | 353 | 404 | 348 |
| Split Tear [N/mm] | 1.76 | 2.09 | 2.4 | 2.55 |
| Tensile [Mpa] | 2.8 | N/A | 3.4 | 3.2 |
| Elongation [%] | 178 | N/A | 210 | 260 |
| % Shrinkage at 50° C., 24 h | 2.1 | N/A | 0.8 | 0.03 |
| % Shrinkage at 75° C., 6 h | 14.0 | 2.7 | 3.6 | 1.8 |
| Compression Set at RT, 24 h | 19.2 | N/A | 27.7 | 27.1 |
| Compression Set at 50° C., 24 h | 85.2 | 86.6 | 70.7 | 78.5 |
| Compression Set at 75° C., 24 h | 99.8 | N/A | 86.7 | 88.6 |
| Rebound | 31 | N/A | 29.3 | 32.0 |

As compared to Comparative Sample 13: Sample 10 has a similar density and comparable properties, but at much higher filler level; Sample 11 shows variability in properties (foam hardness, etc.) by using the same system in different combination than in Sample 10; and for Sample 12, at the same filler level and lower density, Sample 12 has improved properties, in particular in shrinkage, tear and elevated temperature compression set.

Samples 14-17

Table 8 shows a number of formulations that are used to produce crosslinked foam shockpads having a 12 mm thickness. LDPE PG 7004 is a polyethylene having a density of about 0.9215 g/cc and a melt index ($I_2$, 190° C., 2.16 kg) of about 4.1 g/10 minutes; Engage 7256 is an ethylene copolymer having a density of about 0.885 and a melt index $I_2$ of about 2 g/10 minutes. OBC1 is an olefin block copolymer having a density of about 0.887 g/cc, a melt index $I_2$ of about 5 g/10 minutes, a total octene content of about 10.4 mole %, a soft segment C8 content of about 17.6 mole %, a hard segment C8 content of about 0.8 mole %, a soft segment percentage of 67% and a hard segment percentage of 33%. OBC2 is an olefin block copolymer having a density of about 0.877 g/cc, a melt index $I_2$ of about 1 g/10 minutes, a total octene content of about 13.2 mole %, a soft segment C8 content of about 19.7 mole %, a hard segment C8 content of about 1 mole %, a soft segment percentage of 74% and a hard segment percentage of 26%. OBC3 is an olefin block copolymer having a density of about 0.866 g/cc, a melt index $I_2$ of about 1 g/10 minutes, a total octene content of about 15.4 mole %, a soft segment C8 content of about 18.4 mole %, a hard segment C8 content of about 0.9 mole %, a soft segment percentage of 89% and a hard segment percentage of 11%. Mechanical properties for foams made from the formulations presented in Table 8 are given in Table 9, where sample testing is as described above.

TABLE 8

| | Sample No. | | | |
|---|---|---|---|---|
| Component | 14 parts by weight | 15 parts by weight | 16 parts by weight | 17 parts by weight |
| Engage 7256 | 20 | 0 | 0 | 0 |
| LDPE PG 7004 | 80 | 80 | 80 | 80 |
| OBC1 | 0 | 20 | 0 | 0 |
| OBC2 | 0 | 0 | 20 | 0 |
| OBC3 | 0 | 0 | 0 | 20 |
| Affinity GA 1900 | 5 | 5 | 5 | 5 |
| H-Tempo | 0.5 | 0.5 | 0.5 | 0.5 |
| Perkadox 14-40 | 2.5 | 2.5 | 2.5 | 2.5 |
| Celogen AZ130 | 3.6 | 3.6 | 3.6 | 3.6 |
| Zinc Oxide | 2 | 2 | 2 | 2 |
| Stearic Acid | 0.1 | 0.1 | 0.1 | 0.1 |
| Calcium Carbonate | 60 | 60 | 60 | 60 |
| Green MasterBatch | 3 | 3 | 3 | 3 |
| Total parts | 176.7 | 176.7 | 176.7 | 176.7 |

TABLE 9

| | Sample No. | | | |
|---|---|---|---|---|
| | 14 | 15 | 16 | 17 |
| Density (g/cc) | 0.127 | 0.144 | 0.142 | 0.143 |
| Shore A (w. skin), 3 sec. | 38.5 | 43.5 | 41.6 | 40 |
| % Shrinkage at 70° C., 1 hour | 1.09 | 0.76 | 1.09 | 0.98 |
| Compression Set at Room Temperature (24 hours) | 47 | 49.3 | 50 | 50.6 |
| Compression Set at 50° C. (6 hours) | — | 70.8 | 74.2 | 75 |

Figure 3:
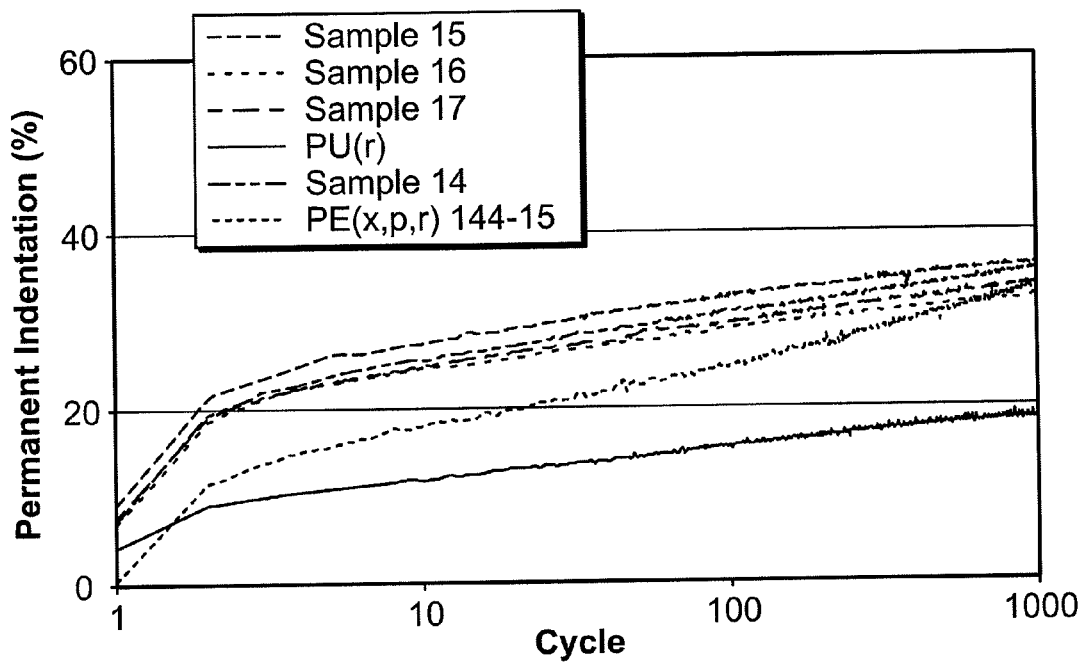
FIG. 3 graphically compares cyclic loading test results for crosslinked foams according to embodiments disclosed herein with results for comparative foam samples.
Figure 4:
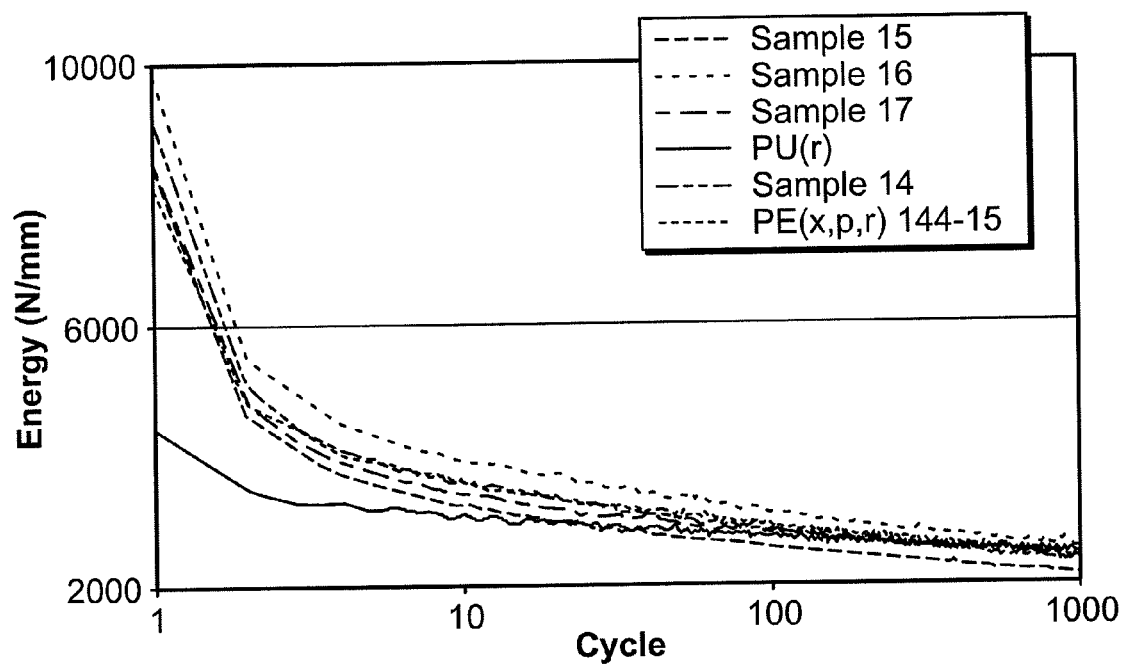
FIG. 4 graphically compares cyclic loading test results for crosslinked foams according to embodiments disclosed herein with results for comparative foam samples.
Figure 5:
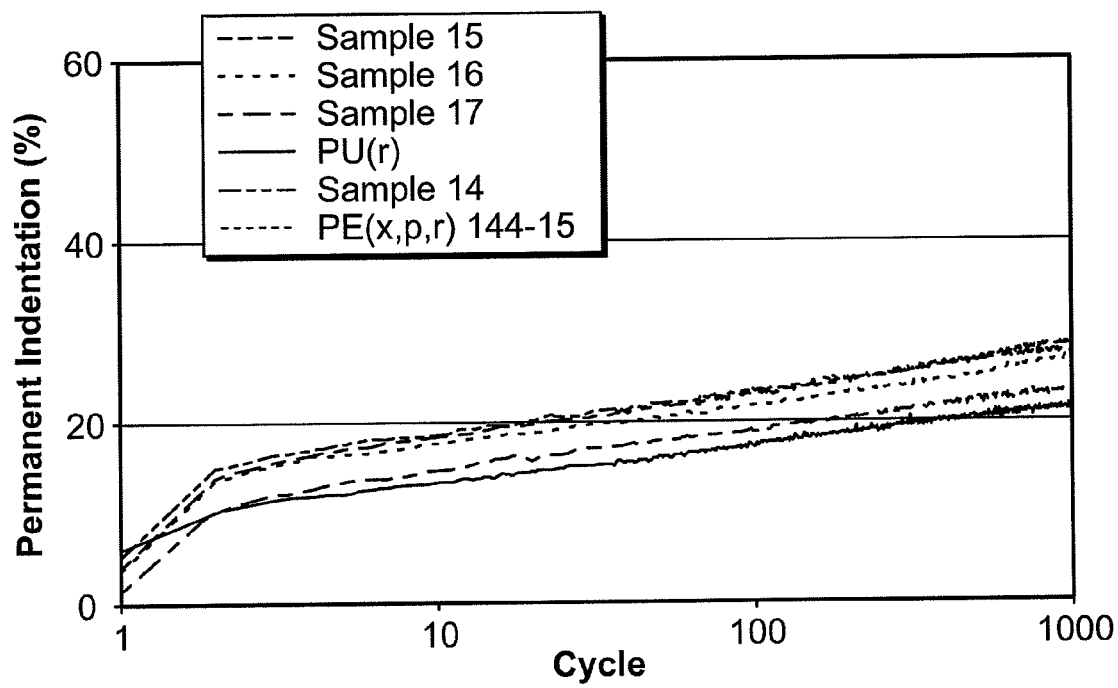
FIG. 5 graphically compares cyclic loading test results for crosslinked foams according to embodiments disclosed herein with results for comparative foam samples.
Figure 6:
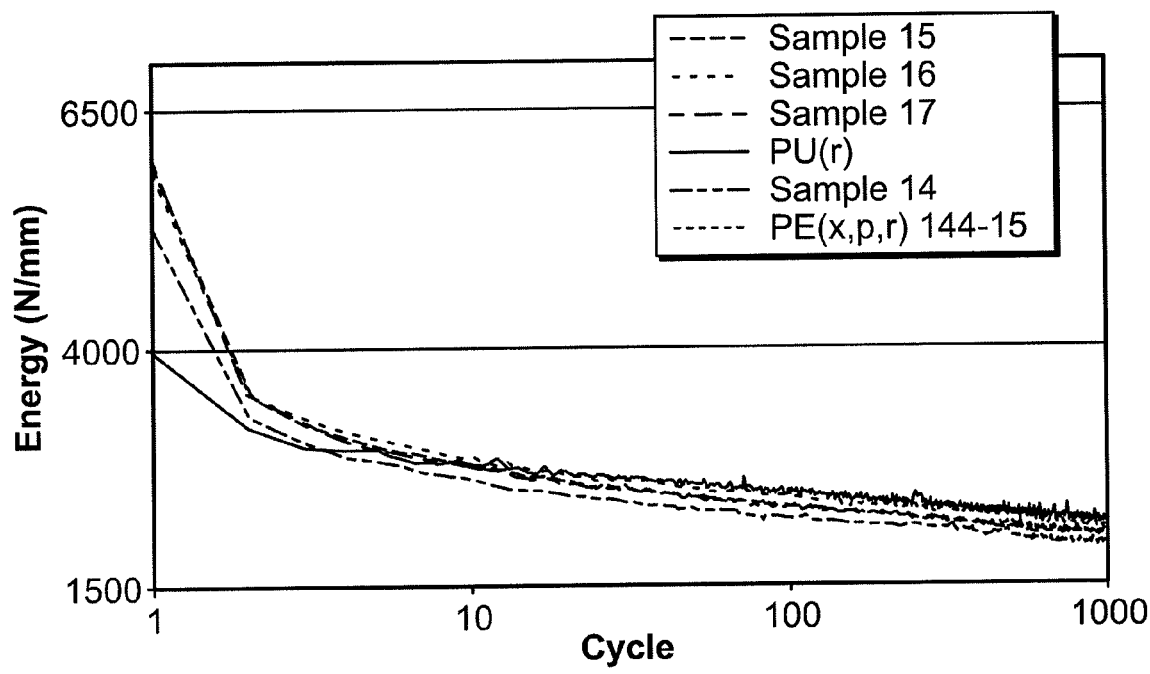
FIG. 6 graphically compares cyclic loading test results for crosslinked foams according to embodiments disclosed herein with results for comparative foam samples.

Cyclic loading tests are performed on Samples 14-17, and are compared to a commercially available PE foam sample PE(x,p,r) 144-15 (a commercially available sample, Schmitz-foam ProPlay-NF, having a density of 144 kg/m³ and a thickness of 15 mm), and a polyurethane foam sample (RECTICEL N250, having a density of 250 kg/m³ and a thickness of 10 mm). FIGS. 3 and 5 present cyclic loading permanent indentation test results at 20° C. and 55° C., respectively. FIGS. 4 and 6 present cyclic loading energy restitution test results at 20° C. and 55° C., respectively.

As shown in FIGS. 3-6, Samples 14-17 perform similar or better than each of the comparative foam samples (the lower the permanent indentation and the higher the Energy Restitution, the better the foam is for the application), especially after a high number of cycles.

As described above, crosslinked foams having a relatively high filler loading according to embodiments described herein may be useful in carpeting, flooring, artificial turf systems, footwear, and other uses. Crosslinked foams described herein, due to the high filler loading, may have good dimensional stability, and may be produced at a low cost. Additionally, embodiments disclosed herein may provide for reduced cycle times due to high processing temperatures afforded via use of a scorch retarder. Polymer blends used to manufacture the foams described herein may provide a broad molecular weight distribution, varying crystallinity, and other properties, which may allow for improved final product properties as compared to prior art foam compositions. In some embodiments, the crosslinked foams described herein may be recycled as a raw material for other end uses.

While a limited number of embodiments have been described, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A crosslinked foam for use in footwear or as a shockpad, the foam comprising the reaction product of:
   A. a first polyolefin having a crystallinity of 21 percent or less, an ethylene vinyl acetate copolymer having a vinyl acetate content of less than 15 mole percent, or a combination thereof;
   B. a second polyolefin having a viscosity between 500 and 20,000 cP, as measured using ASTM D1084, the second polyolefin having a crystallinity of greater than 21 percent;
   C. a filler, wherein the crosslinked foam comprises from 40 to 80 parts filler per hundred parts of components A and B, by weight;
   D. a scorch retarder; and
   E. a third polyolefin having a crystallinity of greater than 21 percent;
   wherein the crosslinked foam, prior to crosslinking, comprises a thermoplastic composition, the thermoplastic composition comprising:
   i. 20 to 80 weight percent of component A;
   ii. 25 to 75 weight percent of component E;
   iii. greater than 0 to 6 weight percent of component B;
   iv. greater than 0 to 1 weight percent of component D; and
   v. 27 to 50 weight percent of component C;
   wherein the above weight percentages are based on the total weight of components A, B, C, D, and E.

2. The crosslinked foam of claim 1, wherein components A and B were crosslinked using a peroxide curing agent.

3. The crosslinked foam of claim 1, wherein components A and B were crosslinked using a heat activated curing system or a radiation induced curing system.

4. The crosslinked foam of claim 3, wherein the heat activated curing system comprises at least one of sulfur and an epoxy.

5. The crosslinked foam of claim 3, wherein the radiation activated curing system comprises at least one of e-beaming and gamma radiation.

6. The crosslinked foam of claim 1, wherein components A and B were crosslinked using a silane derived compound.

7. The crosslinked foam of claim 1 wherein the foam comprises at least about 30 percent by weight gel content as measured using xylene extractables.

8. The crosslinked foam of claim 1, wherein the filler comprises at least one of regrind and calcium carbonate.

9. The crosslinked foam of claim 1, wherein the crosslinked foam has a density within the range from about 50 to about 500 kg/m$^3$.

10. The crosslinked foam of claim 1, wherein the crosslinked foam has an open cell volume of less than 30 percent.

11. The crosslinked foam of claim 1, wherein the crosslinked foam has a thickness in the range from 1 to 80 mm.

12. An artificial turf, carpet, or flooring comprising a shock pad as defined in claim 1.

13. A shoe, boot, or footwear comprising a shock pad as defined in claim 1.

* * * * *